(12) United States Patent
Coleman et al.

(10) Patent No.: US 11,536,953 B2
(45) Date of Patent: Dec. 27, 2022

(54) MULTI-SPOT SCANNING DEVICE, SYSTEM AND METHOD

(71) Applicant: VisiTech International Limited, Sunderland (GB)

(72) Inventors: Steven Coleman, Sunderland (GB); Andrew Roberts, Sunderland (GB); Jafer Sheblee, Sunderland (GB)

(73) Assignee: VisiTech International Limited, Sunderland (GB)

( * ) Notice: Subject to any disclaimer, the term of this patent is extended or adjusted under 35 U.S.C. 154(b) by 100 days.

(21) Appl. No.: 17/049,595

(22) PCT Filed: Apr. 25, 2019

(86) PCT No.: PCT/GB2019/051157
§ 371 (c)(1),
(2) Date: Oct. 22, 2020

(87) PCT Pub. No.: WO2019/207309
PCT Pub. Date: Oct. 31, 2019

(65) Prior Publication Data
US 2021/0239967 A1    Aug. 5, 2021

(30) Foreign Application Priority Data

Apr. 26, 2018 (GB) ..................... 1806845

(51) Int. Cl.
*G02B 26/08* (2006.01)
*G02B 21/00* (2006.01)
*G02B 27/58* (2006.01)

(52) U.S. Cl.
CPC ..... *G02B 26/0875* (2013.01); *G02B 21/0032* (2013.01); *G02B 21/0044* (2013.01); *G02B 21/0048* (2013.01); *G02B 27/58* (2013.01)

(58) Field of Classification Search
None
See application file for complete search history.

(56) References Cited

U.S. PATENT DOCUMENTS

| 6,028,306 | A | * | 2/2000 | Hayashi | ............. | G02B 21/0032 359/368 |
| 2009/0174935 | A1 | * | 7/2009 | Szulczewski | ...... | G02B 21/0048 359/368 |

(Continued)

FOREIGN PATENT DOCUMENTS

WO    2015/031988 A1    3/2015

OTHER PUBLICATIONS

Giulia M.R. De Luca et al., "Re-scan confocal microscopy: scanning twice for better resolution", Biomedical Optics Express, vol. 4, No. 11, Oct. 25, 2013, pp. 2644-2656, ISSN: 2156-7085, DOI: 10.1364/BOE.4.002644. (Year: 2013).*

(Continued)

*Primary Examiner* — Derek S. Chapel
(74) *Attorney, Agent, or Firm* — Rimon PC; Marc Kaufman

(57) ABSTRACT

A confocal microscope device for scanning a two-dimensional array of illumination beams over a target surface and scanning a corresponding two-dimensional array of emission beams stimulated by the array of illumination beams on to a sensor of an imaging device. The device comprises first scanning optics operable to scan the array of illumination beams over the target surface along a first axis and scan the array of emission beams over the sensor along the first axis. The device further comprises second scanning optics operable to deflect, on a second axis, the array of illumination beams as they are scanned over the target surface along the first axis, such that uneven stimulation of the target surface by the array of illumination beams due to interference of the illumination beams is reduced, and deflect, on the second (Continued)

axis, the array of emission beams as they are scanned over the sensor of the imaging device along the first axis such that uneven stimulation of the sensor by the array of emission beams due to interference of the emission beams is reduced.

15 Claims, 11 Drawing Sheets

(56) References Cited

U.S. PATENT DOCUMENTS

2014/0211305 A1    7/2014  Schwedt et al.
2015/0286041 A1*  10/2015  Sheblee ............... G02B 21/367
                                                        348/79

OTHER PUBLICATIONS

Anthony Tsikouras et al., "High-speed multifocal array scanning using refractive window tilting", Biomedical Optics Express, vol. 6, No. 10, Sep. 2, 2015, pp. 3737-3747, ISSN: 2156-7085, DOI: 10.1364/BOE.6.003737. (Year: 2015).*

* cited by examiner

Y-axis scan by second optics
X-axis scan by galvanometer mirror

Y-axis scan by second optics
X-axis scan by galvanometer mirror

MULTI-SPOT SCANNING DEVICE, SYSTEM AND METHOD

CROSS-REFERENCE TO RELATED APPLICATIONS

This application is a national stage of International Application No. PCT/GB2019/051157, filed on Apr. 25, 2019, which claims the benefit of priority from the United Kingdom of Great Britain and Northern Ireland Application No. GB1806845.2, filed Apr. 26, 2018, the disclosures of each of which are hereby incorporated by reference in its entirety.

TECHNICAL FIELD

The present invention relates to an improved confocal scanning, device, system and method.

BACKGROUND

Confocal imaging systems are well known and widely used. Advanced multi-point confocal scanning systems use a technique in which an array of illumination beams is scanned across a sample plane usually by virtue of a galvanometer mirror, piezo mirror or spinning "Nipkow" disk. A corresponding array of emission beams are stimulated (typically through fluorescence) from the sample which are passed through a pinhole array with the same architecture as the illumination beams. This removes any out of focus light so that when the emission beams are scanned or relayed onto a sensor of an imaging device, a focused image is produced.

Such systems enable very high temporal and spatial resolution to be achieved. Each illumination beam incident on the sample surface and corresponding emission beam incident on the imaging plane can be modelled as a point spread function (PSF). The distribution and spacing of the illumination beams incident on the sample surface is such that, in a perfect optical system (i.e. with no unintended optical diffraction), a perfectly uniform illumination field is provided on the sample surface plane, and correspondingly, a perfectly representative image of the sample is produced at the image plane.

However, when imaging real-world samples, particularly living samples, illumination and emission PSFs are subject to diffraction which gives rise to interference between the PSFs. In certain instances, this interference manifests as "striping" artefacts at the image plane and thus in the final image. Further causes of striping artefacts include incorrect synchronisation of scanning components within the system, dust on optical components (for example pinhole arrays used to generate the focused illumination/emission beams) and other minor defects in calibration or manufacture of the system.

It is an aim of certain embodiments of the invention to address the problem of striping artefacts arising in images produced by multi-point confocal scanning systems.

SUMMARY OF THE INVENTION

In accordance with a first aspect of the invention there is provided a confocal microscope device for scanning a two-dimensional array of illumination beams over a target surface and scanning a corresponding two-dimensional array of emission beams stimulated by the array of illumination beams on to a sensor of an imaging device. The device comprises first scanning optics operable to scan the array of illumination beams over the target surface along a first axis and scan the array of emission beams over the sensor along the first axis. The device further comprises second scanning optics operable to deflect, on a second axis, the array of illumination beams as they are scanned over the target surface along the first axis, such that uneven stimulation of the target surface by the array of illumination beams due to interference of the illumination beams is reduced, and deflect, on the second axis, the array of emission beams as they are scanned over the sensor of the imaging device along the first axis such that uneven stimulation of the sensor by the array of emission beams due to interference of the emission beams is reduced.

Optionally, the second axis is substantially orthogonal to the first axis.

Optionally, the second scanning optics are controlled to deflect the array of illumination beams as they are scanned over the target surface along the first axis a distance which is less than the diffraction limit of the optical system.

Optionally, the second scanning optics comprises a first scanning optical element to deflect on the second axis the array of illumination beams as they are scanned over the target surface along the first axis, and a second scanning optical element to deflect, on the second axis, the array of emission beams as they are scanned over the sensor of the imaging device along the first axis, wherein movement of the first scanning optical element and second scanning optical element is synchronised.

Optionally, the first optical element and second optical element are each reflective optical elements which deflect the array of beams by optical reflection.

Optionally, the first optical element and second optical element comprise piezo-actuated mirrors.

Optionally, the first optical element and second optical element are each refractive optical elements which deflect the array of beams by optical refraction.

Optionally, the first optical element and second optical element comprise a resonance-actuated optical window.

Optionally, the first scanning optics comprises a galvanometer mirror.

Optionally, the array of emission beams is scanned on to the sensor by being guided from a first side of the galvanometer mirror via a dichroic mirror to a reverse side of the galvanometer mirror.

Optionally, the first scanning optics comprises a Nipkow disk comprising a first rotating disk comprising an array of microlenses and a second rotating disk comprising a corresponding array of pinholes.

In accordance with a second aspect of the invention, there is provided a method of scanning a two-dimensional array of illumination beams over a target surface and scanning a corresponding two-dimensional array of emission beams stimulated by the array of illumination beams on to a sensor of an imaging device. The method comprises scanning the array of illumination beams over the target surface along a first axis and scanning the array of emission beams over the sensor along the first axis. As the array of illumination beams are scanned over the target surface along the first axis, the method further comprises deflecting the array of illumination beams on a second axis, such that uneven stimulation of the target surface by the array of illumination beams due to interference of the illumination beams is reduced, and as the array of emission beams are scanned over the sensor along the first axis, the method further comprises deflecting the array of emission beams on the second axis, such that uneven stimulation of the sensor by the array of emission beams due to interference of the emission beams is reduced.

Optionally, the second axis is substantially orthogonal to the first axis.

Optionally, the method further comprises: deflecting the array of illumination beams as they are scanned over the target surface along the first axis a distance which is less than the diffraction limit of the device.

Optionally, the method further comprises: scanning the array of emission beams over the sensor along the first axis, and deflecting along the second axis, the array of emission beams as they are scanned over the sensor of the imaging device along the first axis such that uneven stimulation of the sensor by the array of emission beams due to interference of the emission beams along the second axis is reduced.

In accordance with a third aspect of the invention, there is provided a confocal microscope system comprising a confocal microscope device according to the first aspect, a control unit for controlling the first scanning optics and second scanning optics and an imaging device.

In accordance with a fourth aspect of the invention, there is provided a method of assembling a confocal microscope device according to the first aspect, comprising: fitting to a conventional confocal microscope device comprising first scanning optics operable to scan a two-dimensional array of illumination beams over a target surface along a first axis and to scan a corresponding two-dimensional array of emission beams across a sensor of an imaging device, second scanning optics operable to deflect, on a second axis, the two-dimensional array of illumination beams as they are scanned over the target surface along the first axis, such that uneven stimulation of the target surface by the array of illumination beams due to interference of the illumination beams is reduced, and to deflect, on the second axis, the two-dimensional array of emission beams as they are scanned across the sensor so that uneven stimulation of the senor by the array of emission beams due to interference of the emission beams is reduced In accordance with certain aspects of the invention, an arrangement is provided which reduces the appearance of striping artefacts in images generated by multi-beam confocal imaging systems. This is by virtue of the provision of a second set of scanning optics which deflect the illumination beams within the optical path of the device along an axis orthogonal to the scanning axis. This has the effect of "sub-sampling" between the conventional scan lines which reduces the interference between the illumination beams which would otherwise lead to constructive and destructive interference which in turn leads to the striping artefacts.

In conventional confocal microscope arrangements, illumination beams are scanned across a sample surface in a scan pattern dictated by the separation of the aperture patterns of the optics used to produce the beams (typically a microlens arrays and/or a subsequent pinhole array). In certain circumstances this can lead to photo-bleaching of the sample as the same areas of the sample are subject to the illumination beams (i.e. areas of the sample that fall within the scan pattern). In accordance with embodiments of the invention, the amount of illumination that any one area of the sample is exposed to is reduced (by virtue of the fact that the illumination beam is deflected on the second axis). Advantageously therefore, in accordance with certain embodiments of the invention, photo-bleaching of samples may be reduced.

Various further features and aspects of the invention are defined in the claims.

BRIEF DESCRIPTION OF THE DRAWINGS

Embodiments of the present invention will now be described by way of example only with reference to the accompanying drawings where like parts are provided with corresponding reference numerals and in which.

DETAILED DESCRIPTION

Figure 1:
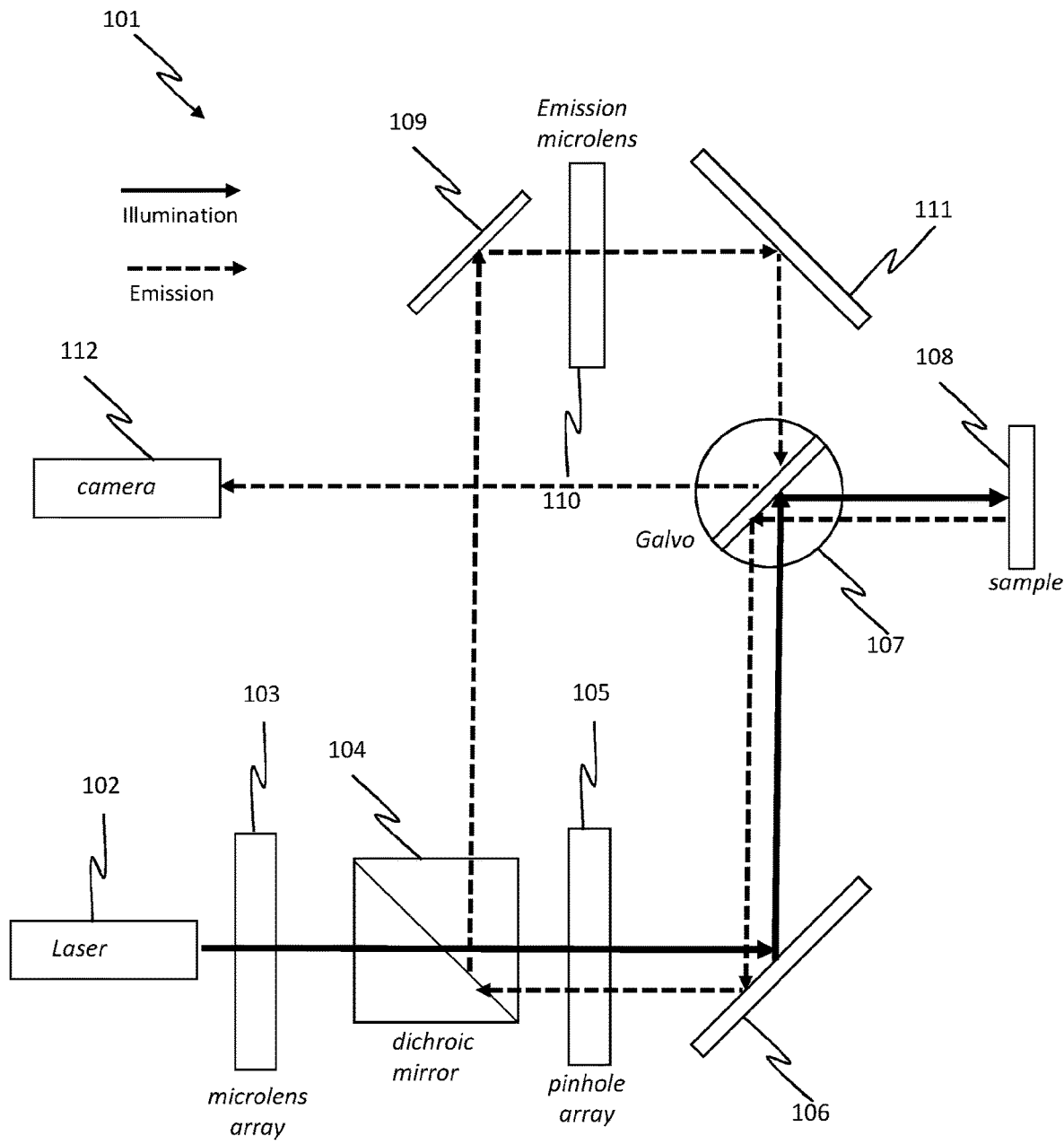
FIG. 1 provides a schematic diagram of a conventional multi-point confocal scanning device.

FIG. 1 provides a simplified schematic diagram of a conventional confocal scanning system 101.

The system comprises a laser light source 102, a two-dimensional microlens array 103, a dichroic mirror 104, a two-dimensional confocal pinhole array 105, a first mirror 106, a galvanometer mirror 107 and a sample stage on which is mounted a sample 108 (target surface). The system further comprises a second mirror 109, an emission microlens 110, a third mirror 111 and an imaging camera 112. As will be understood, a typical confocal scanning system will comprise further components, such as relay optics, however, for clarity such components are omitted from FIG. 1.

The system shown in FIG. 1 is sometimes referred to as a "super-resolution" imaging system by virtue of the provision of the emission microlens 110 (described in more detail below). Certain systems are provided without the emission microlens 110, but the operating principle is the same.

In use, collimated laser light is emitted from the laser light source 102 which is incident on the microlens array 103. This collimated laser light passes through the microlens array 103 and generates a two-dimensional array of beams which passes through the dichroic mirror 104. The foci of the array of beams is then conjugate to the pinhole array 105 which removes any out of focus light from said illumination beams.

The focused illumination beams generated by the microlens array 103 (which have had the out of focus light removed by the pinhole array 105) are incident on the first mirror 106 which reflects the focused illumination beams on to the galvanometer mirror 107. The galvanometer mirror 107 thus scans the focused illumination beams across the sample 108.

An array of emission beams, stimulated by the illumination beams, is incident on the galvanometer mirror 107 and is directed back onto the pinhole array 105 via first the first mirror 106. The pinhole array 105 removes out of focus light and thus generates an array of focused emission beams which are incident on the dichroic mirror 104.

The dichroic mirror 104 reflects the focused emission beams to the second mirror 109 which reflects the focused emission beams to an emission microlens array 110. The emission microlens array 110 is positioned in advance of a further conjugate image plane such that the focal length of each point of emission is reduced by 0.5× and hence the image of each point of emission is shrunk by 0.5×. This "re-scaling" of each point of emission re-assigns high frequency image information into the visible region thus further enhancing spatial and axial resolution. Operation of emission microlenses are known in the art, see for example U.S. patent application Ser. No. 14/380,392.

The focused emission beams, after passing through the emission microlens array 110 are incident on the third mirror 111 which reflects the emission beams on to the back side of the galvanometer mirror 107. The back side of the galvanometer mirror 107 reflects the emission beams on to a sensor of the imaging camera 112.

Movement of the galvanometer mirror 107 "scans" the illumination beams across the sample 108 surface along a first axis (for consistency, the axis along which the galvanometer mirror 107 scans the focused illumination beams will be designated the x-axis). Typical movement of the galvanometer mirror 107 is that it rotates a predetermined amount in a first direction (thus scanning the focused illumination beams across the sample in a first direction along the x-axis), and then rotates a predetermined amount in second direction opposite to the first direction (thus scanning the focused illumination beams across the sample in a second direction along the x-axis opposite the first direction).

The focused emission beams are reflected by the back-side of the galvanometer mirror 107 and are therefore scanned across a sensor of the imaging camera 112 in direct correspondence to the illumination beams being scanned across the sample 108 along the x-axis.

In FIG. 1, the optical path of the illumination beams is represented as a series of solid line arrows, and the optical path of the emission beams represented as a series of broken line arrows.

Figure 2A:
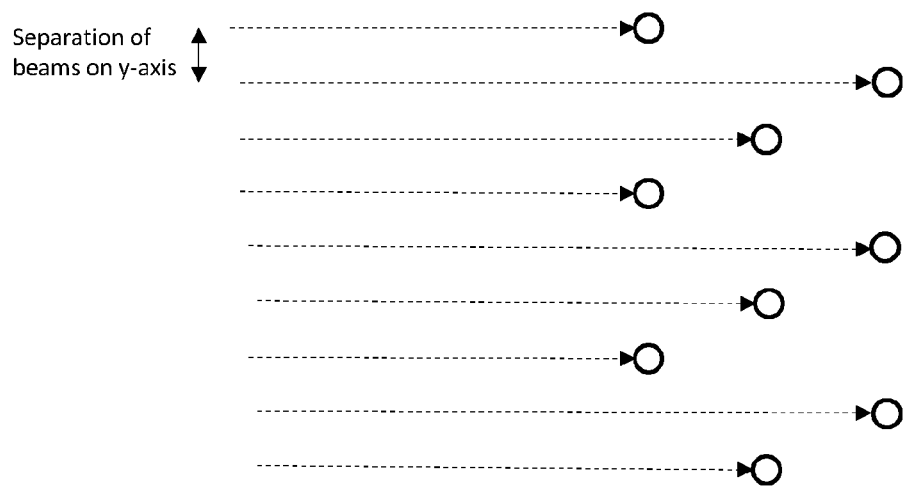
FIG. 2a provides a schematic diagram illustrating a typical scan pattern of an array of illumination beams and emission beams in accordance with the conventional multi-point confocal scanning device shown in FIG. 1.

FIG. 2a provides a schematic diagram depicting the scan pattern of a two-dimensional array of focused illumination beams across a sample surface, and correspondingly, the scan pattern of focused emission beams across the sensor of an imaging camera produced in accordance with conventional confocal scanning techniques, for example the arrangement described with reference to FIG. 1.

The depiction of the focused illumination/emission beams shown in FIG. 2a is exemplary, and in particular, for the purpose of clarity, only a small number of beams are depicted. Typically, in multi-point confocal scanning systems, the microlens array, and correspondingly the pinhole array, may comprise several hundred, or several thousand, microlenses/pinholes resulting in a corresponding number of illumination/emission beams. In certain systems approximately 2200 microlenses/pinholes are provided. The number of microlenses/pinholes can vary depending, for example, on the field of view to be imaged and numerical aperture of the objective being used.

The scan pattern shown in FIG. 2a depicts the centre line of a number of "point spread functions" (PSF). As described above, each illumination beam incident on the sample and each emission beam incident on the sensor can be modelled as a PSF.

In accordance with this model, cumulatively, under ideal imaging conditions, the integrated sum of these PSFs provide a uniform field of illumination and emission. This is depicted in FIG. 2b.

Figure 2B:
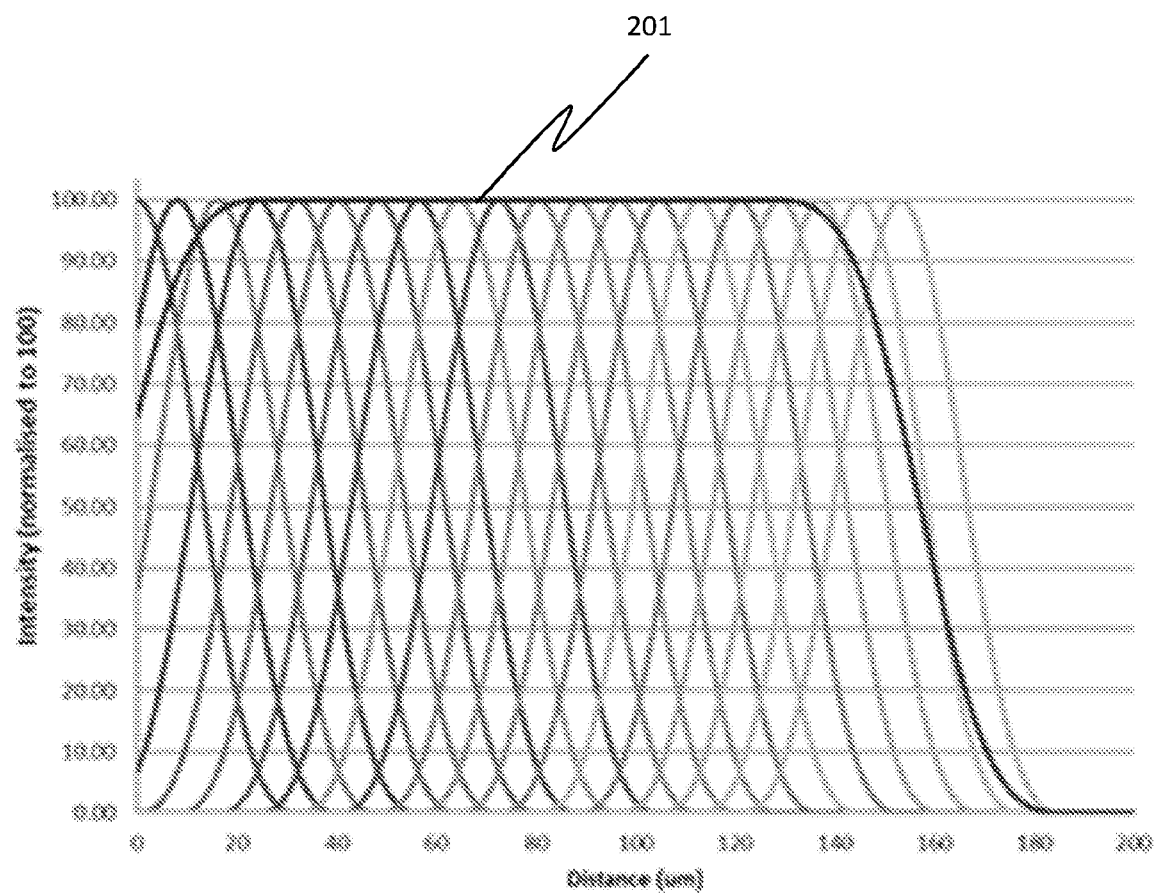
FIG. 2b provides a diagram of a graph depicting the cumulative effect of plurality illumination beams or emission beams modelled as a plurality of point spread functions in ideal conditions.

FIG. 2b provides a graph depicting a model of the cumulative effect of a number of PSFs (each PSF corresponding to an illumination beam incident on the sample surface or each PSF corresponding to an emission beam incident on the sensor). Specifically, a number individual PSFs are shown along with their integrated sum 201. The graph shows separation of the PSFs (x-axis) against PSF intensity (y-axis). The graph in FIG. 2b corresponds to the ideal case where the PSFs combine to provide a uniform field of illumination intensity. Thus, as can be seen, the integrated sum 201 of the PSFs is of a constant value which corresponds to the fact that how, under ideal circumstances, the sample illuminated by an array of illumination beams is illuminated with uniform intensity and the sensor is illuminated with uniform intensity by a corresponding array of emission beams.

In real-world conditions, the illumination beams and the emission beams are subject to diffraction. As a result, the beams interfere with each other. Thus, rather than providing the uniform illumination intensity explained with reference to FIG. 2b, the illumination beams incident on the sample and, correspondingly, the emission beams incident on the sensor, are subject to constructive and destructive interference. This means that the sample is not evenly illuminated (illuminated with even intensity) by the array of illumination beams as the illumination beams are scanned over the sample. Correspondingly, the sensor is not evenly illuminated (illuminated with even intensity) by the array of emission beams as the array of array of emission beams are scanned over the sensor.

Figure 2C:
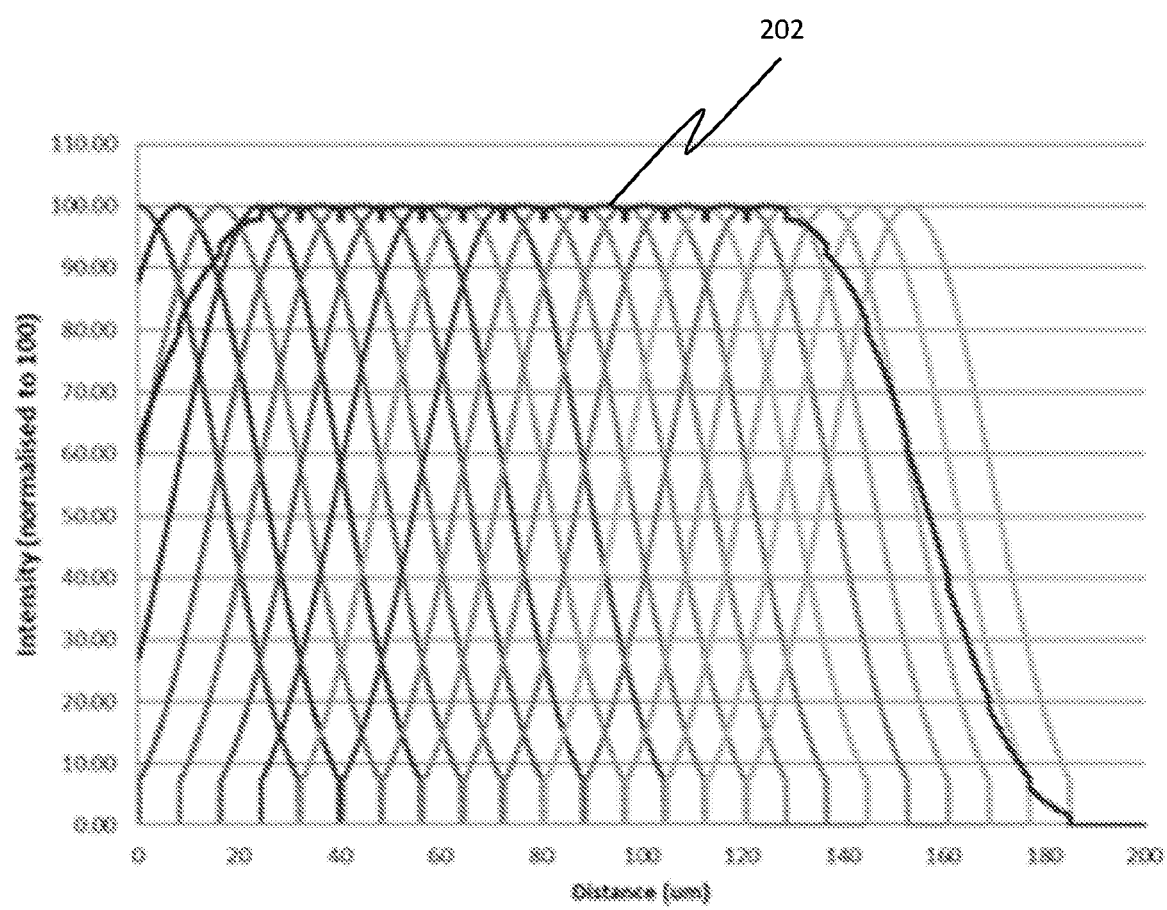
FIG. 2c provides a diagram of a graph depicting the cumulative effect of plurality illumination beams or emission beams modelled as a plurality of point spread functions in real-world conditions.

This is shown in FIG. 2c. FIG. 2c shows a graph depicting a model of the cumulative effect of a number of PSFs (corresponding to illumination beams incident on the sample surface and emission beams incident on the sensor) in "real-world" conditions where the illumination beams and emission beams are subject to diffraction and thus interfere with each other. The axes of the graph in FIG. 2c correspond to the graph shown in FIG. 2b.

As can be seen from the integrated sum 202 of the PSFs shown in FIG. 2c, the interference gives rise to constructive and destructive interference between beams giving rise to an interference pattern comprising repeating changes in illumination intensity along the axis that the beams are scanned. As described above, this manifest as striping artefacts in images produced by the system.

Typical operation of the galvanometer mirror is such that the array of illumination beams is swept back and forth across the sample surface (from the perspective of FIG. 2a, from left to right, then right to left and so on). Typically, this means that the same parts of the sample are subject to a constant interference pattern. This means certain parts of the sample are constantly stimulated by higher intensity illumination beams than other parts. As a result, as well as images including striping artefacts, certain parts of the sample can be subject to photo-bleaching and photo-toxicity.

Using the scan pattern depicted in FIG. 2a, an image of the sample can be integrated on the sensor of the imaging camera from a single sweep of the two-dimensional illumination array in the x-axis across the sample, although in the generation of multiple images (e.g. when capturing video), as described above, there will be multiple sweeps back and forth along the x-axis.

Figure 3:
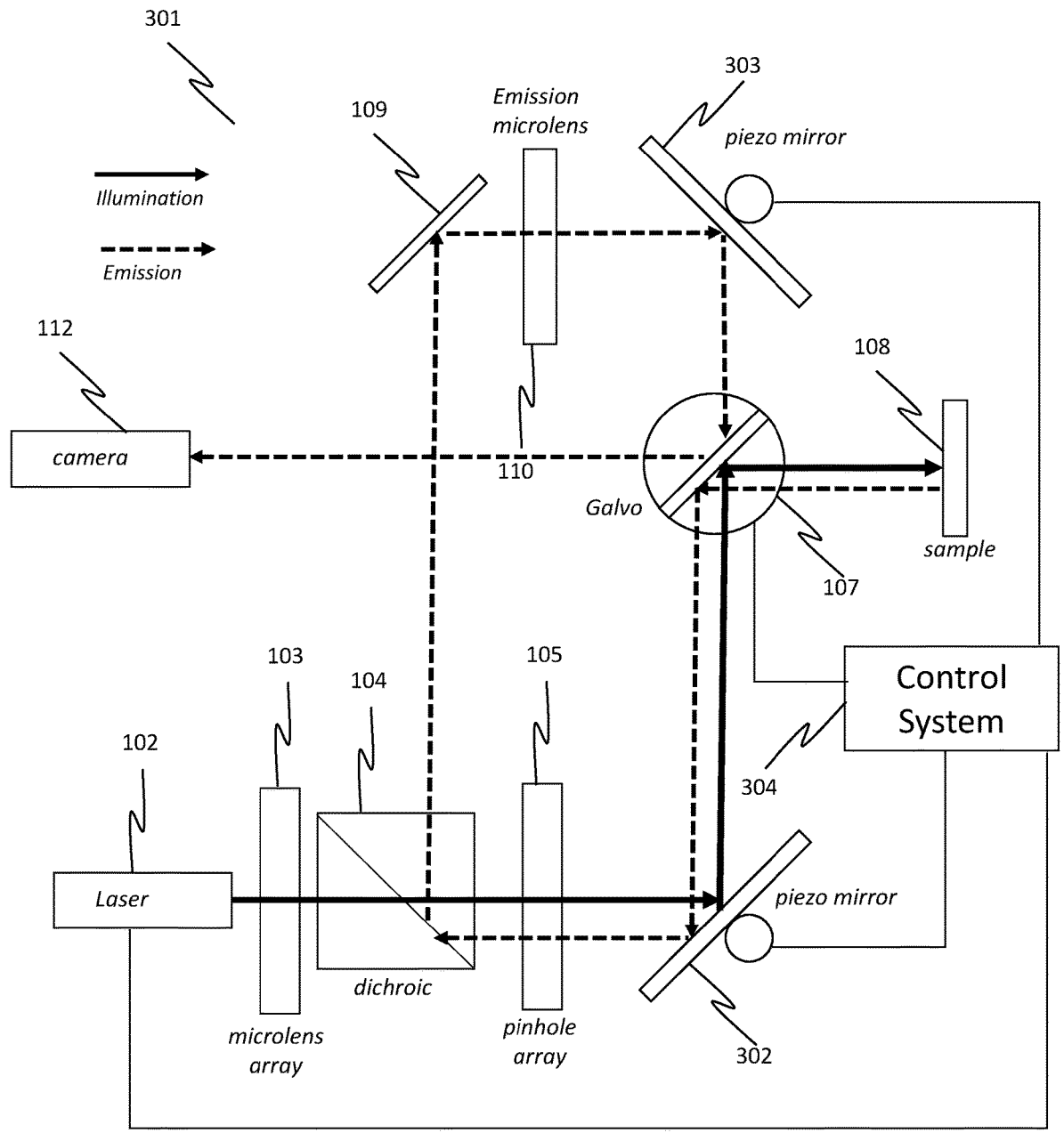
FIG. 3 provides a schematic diagram of a scanning system in accordance with certain embodiments of the invention.

FIG. 3 provides a simplified schematic diagram of a confocal scanning system 301 in accordance with certain embodiments of the invention. In keeping with FIG. 1, in FIG. 3 the optical path of the illumination beams is represented as a series of solid line arrows, and the optical path of the emission beams represented as a series of broken line arrows.

The scanning system depicted in FIG. 3, corresponds to the scanning system shown in FIG. 1, except that a second set of scanning optics is provided. The second set of scanning optics is an additional set of scanning optics which is further to the scanning optics provided in a conventional confocal scanning system. As the galvanometer mirror scans the focused illumination beams across the sample surface along the x-axis, and de-scans the focused emission beams before re-scanning across the sensor of the imaging system along the x-axis, the second set of scanning optics deflects the focused illumination beams incident on the sample, and the focused emission beams incident on the sensor of the imaging device, along an axis orthogonal to the scan axis of the galvanometer mirror.

In the embodiment shown in FIG. 3, the second set of scanning optics are provided by first and second reflective optical elements, specifically, a first piezo-actuated mirror 302 and a second piezo-actuated mirror 303. The first and second piezo-actuated mirrors comprise a reflective mirror surface the orientation of which can be changed by virtue of the operation of a piezo-electric transducer.

The first piezo-actuated mirror 302 is positioned within the system such that it reflects focused illumination beams generated by microlens array 103 (and from which out of focus light has been removed by the pinhole array 105) onto the galvanometer mirror 107. However, the piezo-actuated mirror 302 is controlled to move such that it deflects the focused illumination beams in a direction along a second axis (y-axis) orthogonal to the first axis (x-axis). Correspondingly, stimulated emission beams reflected by the galvanometer mirror 107 are reflected by the first piezo-actuated mirror 302 on to the pinhole array 105.

The second piezo-actuated mirror 303 moves in correspondence with (is synchronised with) the first piezo-actuated mirror 302 and therefore the focused emission beams are deflected (via the back side of the galvanometer mirror 107) across the sensor of the imaging camera 112 in the y-axis in correspondence to the illumination beams being deflected across the sample along the y-axis due to movement of the first piezo-actuated mirror 302.

Figure 4A:
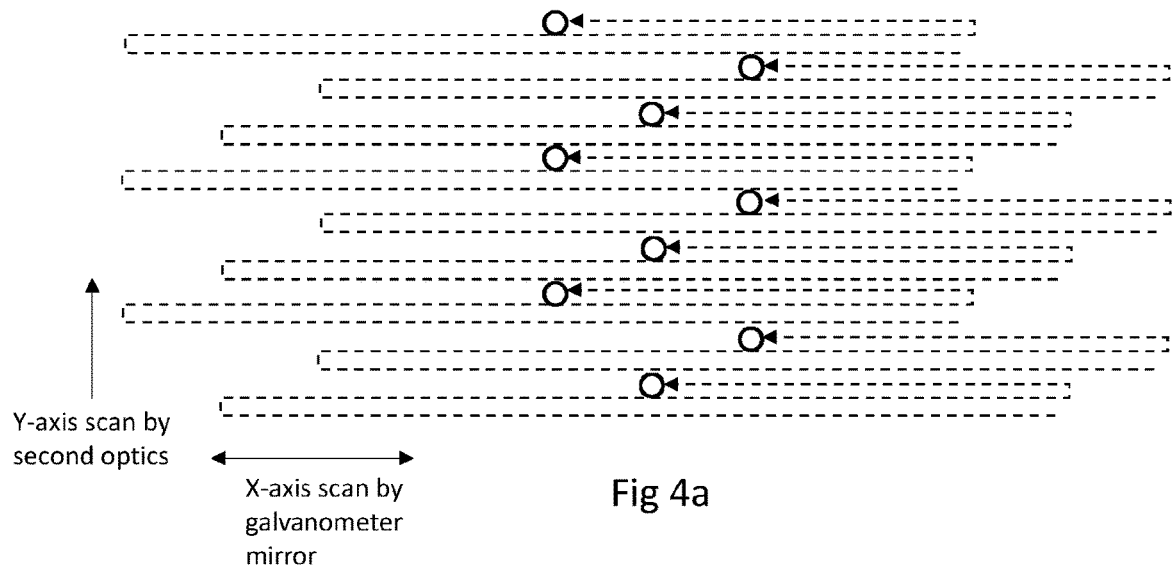
FIGS. 4a, 4b and 4c provide schematic diagrams depicting example scan patterns of an array of illumination beams across a sample, and correspondingly an array of emission beams across a sensor of an imaging camera in accordance with certain embodiments of the invention.

FIG. 4a provides a schematic diagram of a scan pattern (of the focused illumination beams on the sample and, correspondingly, of the focused emission beams on the imaging camera sensor) made possible by virtue of the provision of the first and second piezo-actuated mirrors 302, 303.

The scan pattern comprises multiple sweeps (back and forth) in the x-axis by the galvanometer mirror. After each sweep has been completed, the position of the beams is deflected (in the y-axis) by virtue of actuation of the piezo-actuated mirrors. Thus, as the galvanometer mirror scans the focused illumination beams across the sample and the focused emission beams across the sensor of the imaging system along the x-axis, the first and second piezo-actuated mirrors deflect the focused illumination beams across the sample and the focused emission beams across the sensor of the imaging system along the y-axis.

As can be appreciated by comparing FIG. 4a with FIG. 2a, an area of the sample between the conventional scan lines is sub-sampled.

This sub-sampling between the conventional position of the scan-lines reduces the interference between the illumination beams incident on the sample and the emission beams incident on the sensor. As a result, the constructive and destructive interference described above is reduced. As a result, uneven stimulation (uneven illumination intensity) across the sample by the array of illumination beams due to interference of the illumination beams is reduced. Further, uneven stimulation (uneven emission intensity) of the sensor by the array of emission beams due to interference of the emission beams is reduced.

This reduction in interference of the illumination beams on the sample and reduction in interference of the emission beams on the sensor reduces or substantially eliminates the effect of striping artefacts in the final image.

Figure 7A:
FIG. 7a provides an image of a pollen cell captured using a conventional confocal scanning device, and FIG. 7b provides an image of a pollen cell captured using a confocal scanning device arranged in accordance with an embodiment of the invention where it can be seen that striping artefacts are reduced.
Figure 7B:
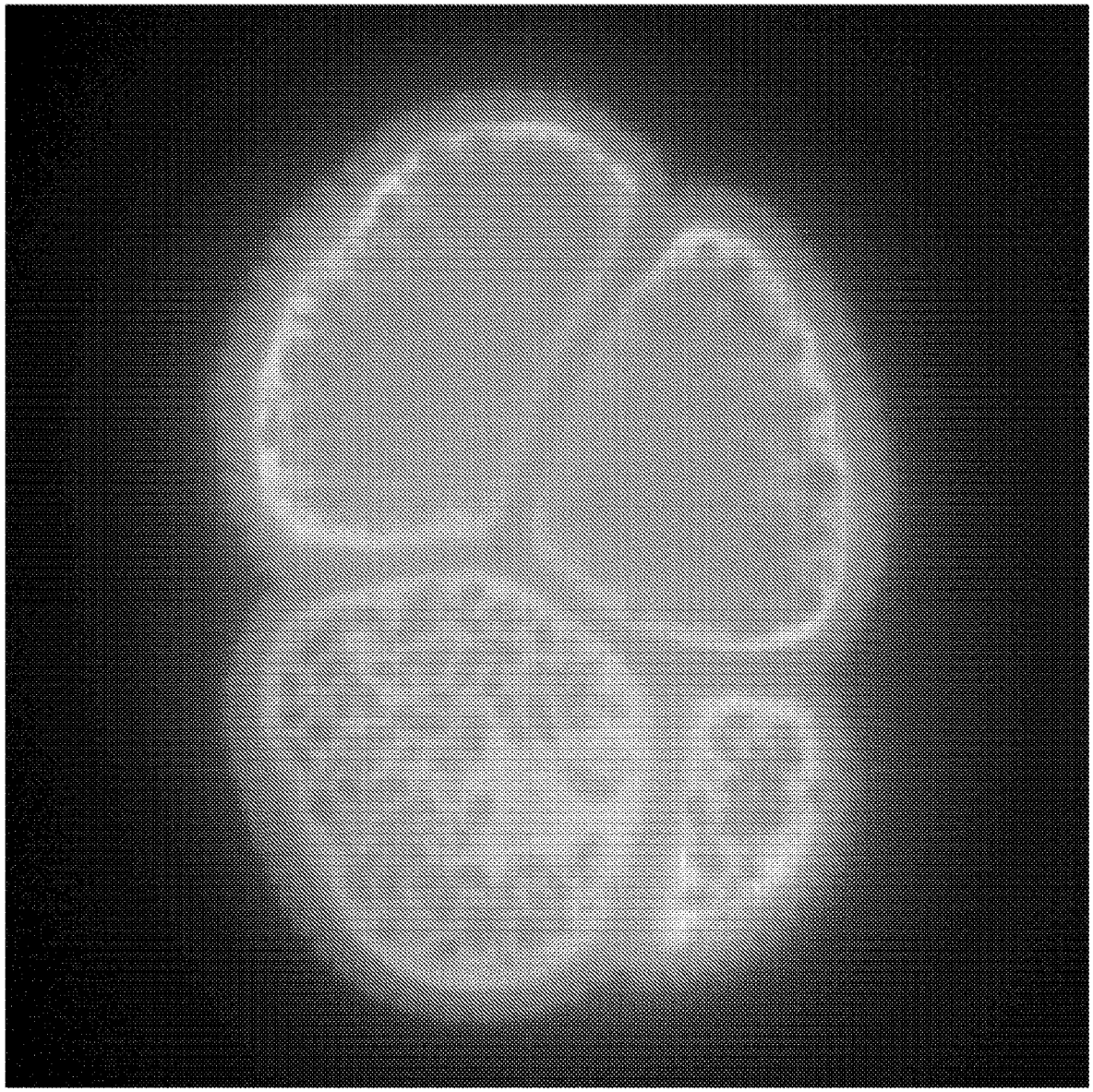

FIG. 7a provides an image of a pollen cell captured using a conventional multi-point confocal scanning system and in which striping artefacts can be clearly seen. FIG. 7b provides an image of a pollen cell captured using a multi-point confocal scanning system arranged in accordance with an embodiment of the invention where it can be seen that the striping artefacts are substantially reduced.

The scan pattern depicted in FIG. 4a is a result of the piezo-actuated mirrors moving in a step-wise fashion, i.e. at the end of every sweep in a direction along the x-axis by the galvanometer, shifting in position to move the beams in a direction along the y-axis.

In certain embodiments, the total amount that the piezo-actuated mirrors deflect the illumination beams and emission beams during one image integration is a sub-diffraction distance. That is, the focused illumination beams are deflected a distance on the sample surface in a direction along the y-axis which is smaller than a distance than can be resolved optically by the system, i.e. less than a diffraction limit length of the system. Correspondingly, the focused emission beams are deflected a distance on the sensor in a direction along the y-axis which is smaller than a distance that can be resolved optically by the system In certain embodiments, rather than moving in a step-wise fashion, the piezo-actuated mirrors may move continually during the sweep along the x-axis by the galvanometer mirror. An example scan pattern in such embodiments is depicted in FIG. 4b.

Figure 4B:
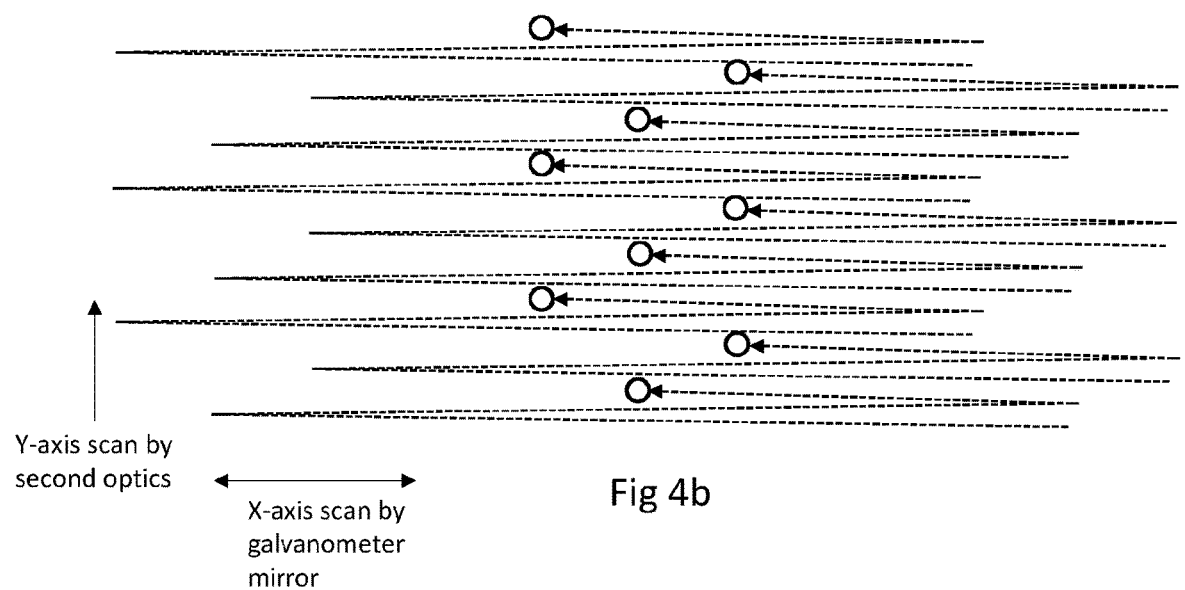

FIGS. 4a and 4b show simplified scan patterns in which three sweeps of the galvanometer mirror are shown. However, more typically, in certain embodiments, a single integration at the sensor of the imaging camera is taken during 12 complete sweeps of the galvanometer (along the x-axis) whilst the piezo-actuated mirrors shift the beams in one direction of the y-axis. A typical galvanometer frequency is approximately 360 Hz. Integrating the sensor over 12 sweeps of the galvanometer thus gives an image capture rate of 30 Hz.

Figure 4C:
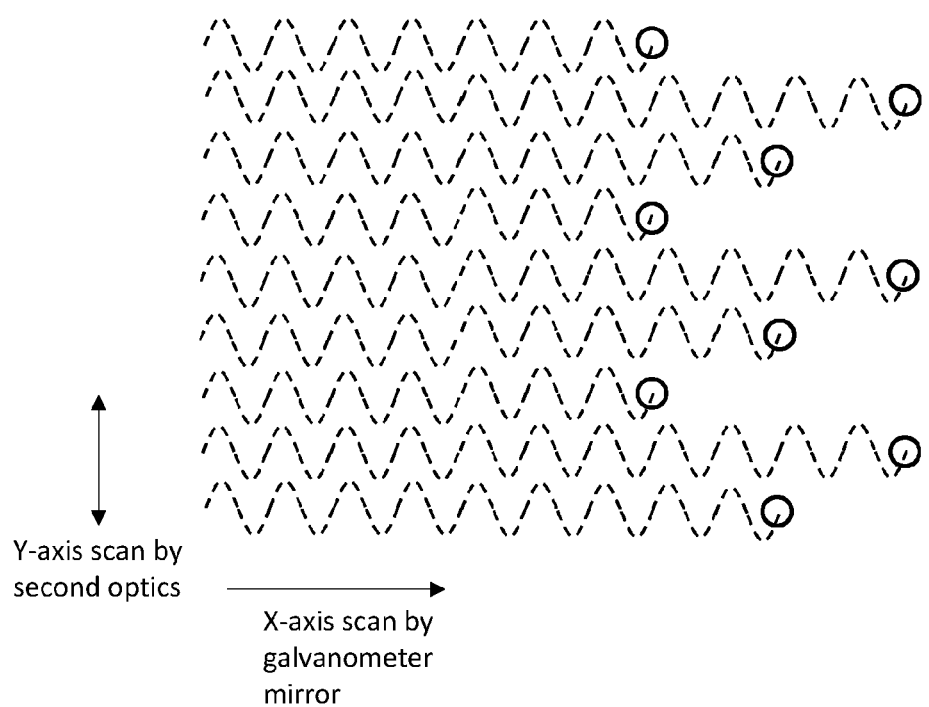

In certain embodiments, the piezo-actuated mirrors may move at a substantially higher frequency than the frequency at which the galvanometer mirror moves. An example of such a scan pattern is shown in FIG. 4c. In the scan pattern shown in FIG. 4c, the scan pattern of each beam is substantially sinusoidal. As will be appreciated, using the scan pattern depicted in FIG. 4c, an image can be integrated by the sensor of the imaging camera from a single sweep of the galvanometer mirror.

Typically, as shown in FIG. 3, a control system coordinates operation of the imaging camera, galvanometer, first and second piezo-actuated mirrors.

Typically, the control system ensures that the movement of the galvanometer mirror is synchronised with the movement of the first and second piezo-actuated mirrors and that movement of the first and second piezo-actuated mirrors is synchronised. In certain embodiments, the control system is also arranged to co-ordinate operation of the laser light source. For example, when using a "step-wise" scan pattern as illustrated for example in FIG. 4a, the control system is arranged to modulate (e.g. reduce) the intensity of the laser at the points of the scan where the second scanning optics shift the scan pattern in the y-axis.

The control system is typically provided by a suitable programmed microprocessor system.

The microprocessor system typically includes a memory comprising software for controlling operation of the system, a microprocessor for executing the software and suitable input/output interfaces for sending data to and receiving data from the controlled components of the system (e.g. the piezo actuated mirrors, the galvanometer mirror, the light source and the imaging camera). The control system typically includes a control interface allowing a user to control operation of the system (e.g. start scanning, stop scanning etc). In certain embodiments, the control interface is adapted to receive control information enabling a user to specify certain operating variables such as step size, scan rate, scan patterns, and timings for triggers in and out. Advantageously, this can allow a user to specify aspects of the scan pattern.

The second set of scanning optics can be provided by any means suitable for deflecting the focused illumination beams and the focused emission beams along the y-axis and that can be controlled by the control system.

In the embodiment described with reference to FIG. 3, an emission microlens array is present in the optical path of the focused emission beams between the dichroic mirror and the galvanometer. However, in certain embodiments, the emission microlens array is omitted and the operation of the system is substantially the same as described above albeit that the resolution of the system is reduced.

In certain embodiments, rather than deflect the beams by reflection (as is done by the piezo-actuated mirrors), the beams are deflected by suitable refractive optical elements. For example, one or both of the first and second piezo-actuated mirrors could be replaced by a suitably actuated optical window.

An optical window is an optical element that deflects light that passes through it by refraction. Changing the optical axis of the optical window relative to the incident beams allows the amount the beam is deflected to be controlled. Suitable actuation means for changing the orientation of an optical window to change the optical axis relative to the incident beams include means to force the optical window to resonate such as a piezo electric motor or a galvanometer scanner.

In another embodiment using refraction, a suitably shaped (for example hexagonal) optical element is arranged to spin in a predetermined direction which causes the beams to be deflected in a direction on the y-axis. One or both optical elements could be replaced by such spinning optical elements.

In another embodiment using refraction, a pair of lenses are actuated to move relative to each other. This cause the beams passing through the pair of lens to be deflected in a direction on the y-axis. One or both optical elements could be replaced by such a pair of lenses.

In another embodiment, the first piezo actuated mirror described with reference to FIG. 3 could be replaced with a modified galvanometer mirror provided with an actuator controlled by the control system and arranged to tilt the galvanometer mirror in the y-axis.

Figure 5:
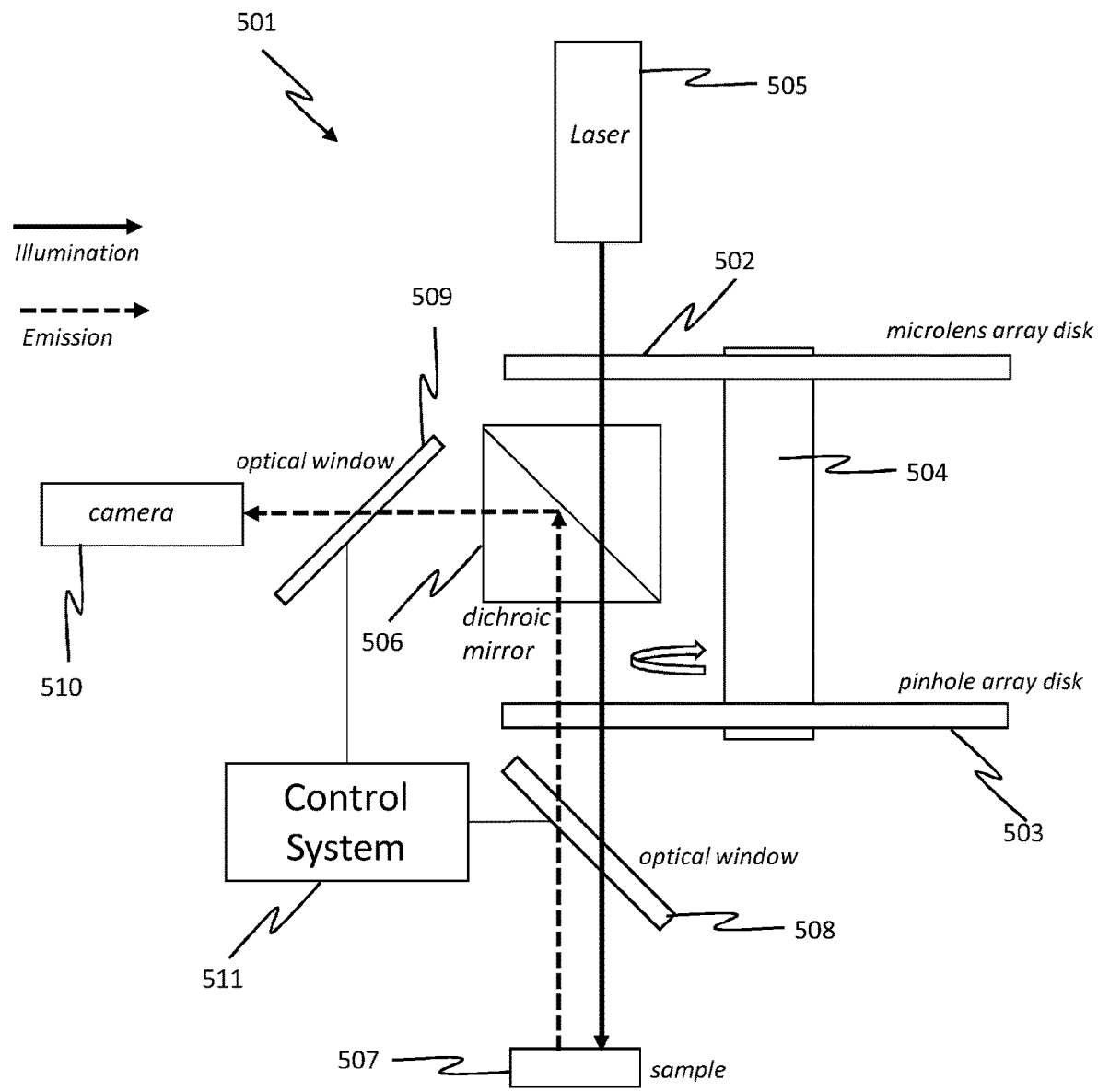
FIG. 5 provides a schematic diagram of a scanning system in accordance with certain embodiments of the invention.

FIG. 5 provides a simplified schematic diagram of a confocal scanning system 501 in accordance with certain embodiments of the invention. In keeping with FIGS. 1 and 3, in FIG. 5 the optical path of the illumination beams is represented as a series of solid line arrows, and the optical path of the emission beams represented as a series of broken line arrows.

Specifically, FIG. 5 depicts a modified "Nipkow disk" scanning system. The system 501 comprises a first disk 502 and a second disk 503 connected to a common driving axle 504 which in operation spins the disks. The first disk 502 comprises an array of microlenses, typically arranged in a series of Archimedean spirals. The second disk 503 comprises a corresponding array of pinholes.

Collimated light from a light source 505 is incident on a scanning region of the first disk 502 which, as the disks rotate, generates an array of moving illumination beams. The array of illumination beams passes through a dichroic mirror 506, disposed between the first and second disk, and are incident on the second disk 503 producing a moving array of focused illumination beams which as the disks spin continually scan across a sample 507 along an arc which is essentially equivalent to a first axis.

Figure 6A:
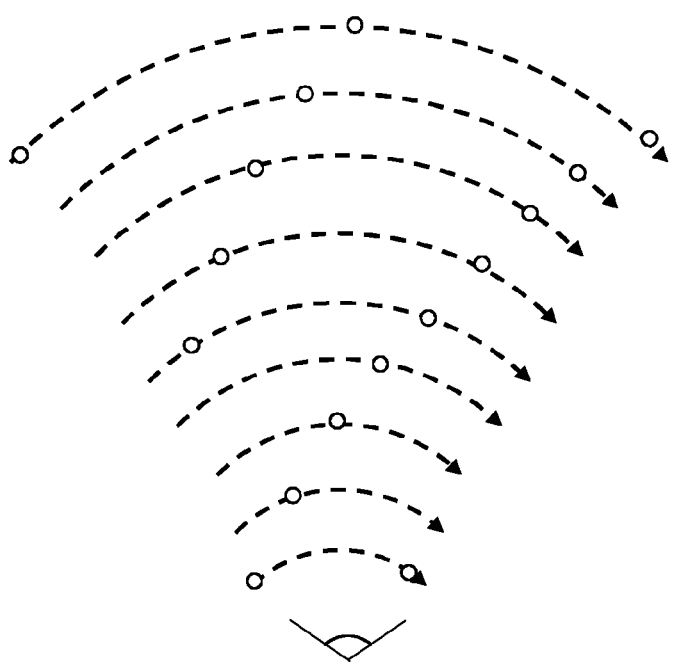
FIG. 6a provides a schematic diagram of a scan pattern of a conventional Nipkow-based confocal scanning system.

In accordance with conventional operation of a Nipkow disk confocal scanning system, the light emissions generated by virtue of the illumination beams are incident on the scanning region of the pinhole array disk generating an array of focused moving emission beams which are then reflected via the dichroic mirror 506 to an imaging camera. In this way, the illumination beams are continuously scanned across a sensor of the imaging camera allowing images of the sample 507 to be produced. A simplified representation of a typical scan pattern produced by a conventional Nipkow disk scanning system is shown in FIG. 6a. As will be understood, FIG. 6a shows a simplified representation of an array of beams. A typical Nipkow-based array of illumination beams will comprise many more beams than shown in FIG. 6a.

However, as can be seen in FIG. 5, in accordance with certain embodiments of the invention, a second set of scanning optics is provided, namely a first optical window 508 disposed between the second disk 503 and the sample 507 and a second optical window 509 disposed between the dichroic mirror 506 and an imaging camera 510. The first optical window 508 operates in a corresponding fashion to the first piezo-actuated mirror described with reference to FIG. 3, that is the first optical window 508 is controlled to deflect, by diffraction, the illumination beams in a direction along a second axis, substantially orthogonal to the first axis. The deflection of the illumination beams along the second axis is such that an area of the sample between the conventional scan lines is sub-sampled. The second optical window 509 operates in a corresponding fashion to the second piezo-actuated mirror described with reference to FIG. 3, that is the second optical window 509 is controlled to scan the emission beams across the sensor of the imaging camera 510 in a direction along a second axis, substantially orthogonal to the first axis along which the illumination beams are scanned due to the rotation of the disks. Operation of the first and second optical windows is controlled and synchronised by a control system 511.

In operation of a typical conventional Nipkow confocal scanning system, the two-dimensional microlens array on the first disk, and correspondingly the two-dimensional pinhole array on the second disk, are arranged in an array of spirals such that an image can be integrated for a predetermined angular rotation of the disks e. This is depicted in FIG. 6*a*.

Figure 6B:
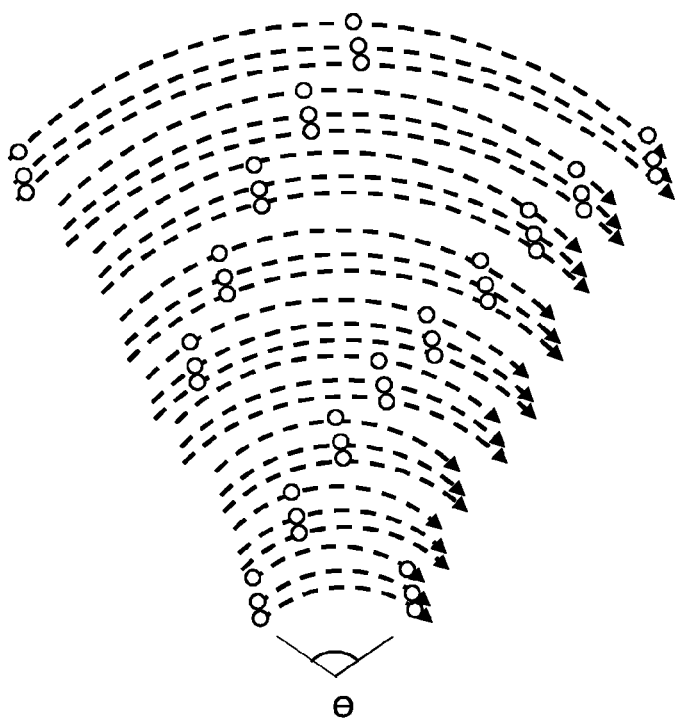
FIG. 6b provides a schematic diagram of a scan pattern of a confocal scanning system in accordance with certain embodiments of the invention.

In certain embodiments, the first optical window 508 is arranged to deflect the illumination beams, and the second optical window 509 is arranged to deflect the emission beams after the disks have rotated by a predetermined angular rotation, e.g. e as described above. This is depicted in FIG. 6*b* which depicts a scan pattern corresponding to that shown in FIG. 6*a* but in which the optical window 508 has deflected the illumination beams, step-wise, twice, and the second optical window 509 has deflected the emission beams, step-wise, twice. The scan pattern depicted in FIG. 6*b* results in a more even illumination of the sample by the illumination beams and a more even illumination of the sensor by the emission beams.

In accordance with certain embodiments, alternative, rotating disk-based implementations are envisaged whereby a rotating disk is provided that comprises an array of slits and/or pinholes.

In accordance with an embodiment of the invention, a process is provided for generating sample images using a modified confocal scanning apparatus. The process comprises scanning an array of illumination beams over a target surface along a first axis and scanning a corresponding array of emission beams over a sensor along the first axis. As the array of illumination beams are scanned over the target surface along the first axis, the process further comprises deflecting the array of illumination beams on a second axis, such that uneven stimulation of the target surface by the array of illumination beams due to interference of the illumination beams is reduced, and as the array of emission beams are scanned over the sensor along the first axis, the method further comprises deflecting the array of emission beams on the second axis, such that uneven stimulation of the sensor by the array of emission beams due to interference of the emission beams is reduced.

In accordance with certain embodiments of the invention, a method of retrofitting components to a conventional confocal system is provided.

A conventional confocal microscope system is provided for scanning a two-dimensional array of illumination beams over a target surface and scanning a corresponding two-dimensional array of emission beams stimulated by the array of illumination beams on to a sensor of an imaging device. The conventional system comprises first scanning optics operable to scan the array of illumination beams over the target surface along a first axis and to scan the corresponding emission beams across the sensor along the first axis.

In accordance with the method, a second set of scanning optics are fitted to the system. The second set of scanning optics are arranged, in operation, to deflect, on a second axis, typically orthogonal to the first axis, the array of illumination beams as they are scanned over the target surface along the first axis by the first scanning optics. The second optics are further arranged, in operation, to deflect, on the second axis, the array of emission beams as they are scanned over the sensor along the first axis by the first scanning optics.

For example, a conventional confocal system as depicted in FIG. 1 can be provided. To this conventional system, first and second piezo-activated mirrors 302, 303 are fitted as depicted in FIG. 3 to replace the first mirror 106 and third mirror 111 and a suitable control system (e.g. control system 304) added, or an existing control system suitably modified.

In certain embodiments of the invention, a device is provided which comprises components necessary to implement a confocal scanning system as shown for example in FIGS. 3 and 5. Such devices include the first scanning optics for scanning the illumination beams and emissions beams in the x-axis (e.g. a galvanometer mirror), the second optics (e.g. the first and second piezo-actuated mirrors) for deflecting the illumination and emission beams in the y-axis and the control system. Other components of the system (e.g. the imaging camera and light source) may be provided separately from the device.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A confocal microscope device for scanning a two-dimensional array of illumination beams over a target surface and scanning a corresponding two-dimensional array of emission beams stimulated by the array of illumination beams on to a sensor of an imaging device, the device comprising:
   first scanning optics operable to scan the array of illumination beams over the target surface along a first axis and scan the array of emission beams over the sensor along the first axis, and
   second scanning optics operable to:
   deflect, on a second axis, the array of illumination beams as they are scanned over the target surface along the first axis, such that uneven stimulation of the target surface by the array of illumination beams due to interference of the illumination beams is reduced, and
   deflect, on the second axis, the array of emission beams as they are scanned over the sensor of the imaging device along the first axis such that uneven stimulation of the sensor by the array of emission beams due to interference of the emission beams is reduced, wherein
   the second scanning optics comprises:
   a first scanning optical element to deflect on the second axis the array of illumination beams as they are scanned over the target surface along the first axis, and
   a second scanning optical element to deflect, on the second axis, the array of emission beams as they are scanned over the sensor of the imaging device along the first axis, wherein movement of the first scanning optical element and second scanning optical element is synchronised.

2. A confocal microscope device according to claim 1, wherein the second axis is substantially orthogonal to the first axis.

3. A confocal microscope device according to claim 1, wherein the second scanning optics are controlled to deflect the array of illumination beams as they are scanned over the target surface along the first axis a distance which is less than the diffraction limit of the device.

4. A confocal microscope device according to claim 1, wherein the first scanning optical element and second scanning optical element are each reflective optical elements which deflect the array of beams by optical reflection.

5. A confocal microscope device according to claim 4, wherein the first scanning optical element and second scanning optical element comprise piezo-actuated mirrors.

6. A confocal microscope device according to claim 1, wherein the first scanning optical element and second scanning optical element are each refractive optical elements which deflect the array of beams by optical refraction.

7. A confocal microscope device according to claim 6, wherein the first scanning optical element and second scanning optical element comprise a resonance-actuated optical window.

8. A confocal microscope device according to claim 1, wherein the first scanning optics comprises a galvanometer mirror.

9. A confocal microscope device according to claim 8, wherein the array of emission beams is scanned on to the sensor by being guided from a first side of the galvanometer mirror via a dichroic mirror to a reverse side of the galvanometer mirror.

10. A confocal microscope device according to claim 1, wherein the first scanning optics comprises a Nipkow disk comprising a first rotating disk comprising an array of microlenses and a second rotating disk comprising a corresponding array of pinholes.

11. A confocal microscope system comprising a confocal microscope device according claim 1, a control unit for controlling the first scanning optics and second scanning optics and an imaging device.

12. A method of assembling a confocal microscope according to claim 1 comprising:
fitting to a conventional confocal microscope device comprising first scanning optics operable to scan a two-dimensional array of illumination beams over a target surface along a first axis and to scan a corresponding two-dimensional array of emission beams across a sensor of an imaging device, second scanning optics operable to deflect, on a second axis, the two-dimensional array of illumination beams as they are scanned over the target surface along the first axis, such that uneven stimulation of the target surface by the array of illumination beams due to interference of the illumination beams is reduced, and to deflect, on the second axis, the two-dimensional array of emission beams as they are scanned across the sensor so that uneven stimulation of the senor by the array of emission beams due to interference of the emission beams is reduced.

13. A method of scanning a two-dimensional array of illumination beams over a target surface and scanning a corresponding two-dimensional array of emission beams stimulated by the array of illumination beams on to a sensor of an imaging device, the method comprising:
scanning the array of illumination beams over the target surface along a first axis with first scanning optics;
scanning the array of emission beams over the sensor along the first axis with the first scanning optics, and
as the array of illumination beams are scanned over the target surface along the first axis, deflecting the array of illumination beams on a second axis with a first scanning optical element of second scanning optics, such that uneven stimulation of the target surface by the array of illumination beams due to interference of the illumination beams is reduced, and
as the array of emission beams are scanned over the sensor along the first axis, deflecting the array of emission beams on the second axis with a second scanning optical element of the second scanning optics, such that uneven stimulation of the sensor by the array of emission beams due to interference of the emission beams is reduced, wherein movement of the first scanning optical element and second scanning optical element is synchronised.

14. A method according to claim 13, wherein the second axis is substantially orthogonal to the first axis.

15. A method according to claim 13, comprising
deflecting the array of illumination beams as they are scanned over the target surface along the first axis a distance which is less than the diffraction limit of the device.

* * * * *